United States Patent
Sampson et al.

(10) Patent No.: US 8,099,973 B2
(45) Date of Patent: Jan. 24, 2012

(54) ENVIRONMENTAL CONTROL SYSTEM

(75) Inventors: Bernard Francis Sampson, Bridgwater (GB); Robert John Harvey, Yeovil (GB)

(73) Assignee: Honeywell Normalair-Garrett (Holdings) Limited, Yeovil, Somerset (GB)

( * ) Notice: Subject to any disclaimer, the term of this patent is extended or adjusted under 35 U.S.C. 154(b) by 671 days.

(21) Appl. No.: 12/276,626

(22) Filed: Nov. 24, 2008

(65) Prior Publication Data

US 2009/0138125 A1 May 28, 2009

(30) Foreign Application Priority Data

Nov. 26, 2007 (EP) .................................. 07022904

(51) Int. Cl.
F25D 9/00 (2006.01)
(52) U.S. Cl. .......................................... 62/401; 62/500
(58) Field of Classification Search .................. 62/401, 62/408, 411, 500; 165/908; 417/151, 179; 700/276; 60/39.37, 751
See application file for complete search history.

(56) References Cited

U.S. PATENT DOCUMENTS

| | | | | |
|---|---|---|---|---|
| 3,800,531 A * | 4/1974 | Sharpe | ............................ | 60/263 |
| 3,842,720 A * | 10/1974 | Herr | ................................ | 454/71 |
| 4,842,777 A * | 6/1989 | Lamort | ........................ | 261/79.2 |
| 5,213,494 A * | 5/1993 | Jeppesen | ........................ | 431/343 |
| 5,287,694 A * | 2/1994 | Davis et al. | ..................... | 60/785 |
| 5,628,623 A * | 5/1997 | Skaggs | ......................... | 417/151 |
| 6,312,230 B1 * | 11/2001 | Popov | ........................... | 417/196 |

* cited by examiner

*Primary Examiner* — Mohammad Ali
(74) *Attorney, Agent, or Firm* — MacMillan, Sobanski & Todd, LLC

(57) ABSTRACT

An environmental control system for conditioning air in a vehicle compartment, such as an aircraft cabin. Cool expanded higher-pressure air from a turbine is mixed with recirculated warmer, lower pressure air from the compartment. The air is mixed and recirculated by a jet pump which includes an inlet section, an outlet section, a diffuser section and a mixing section. The mixing section includes a plurality of separate mixing chambers. The diffuser section includes diffusers for receiving mixed gases from each of the mixing chambers. The outlet section receives the mixed gases which are then conveyed to the compartment. The inlet section includes for each of the mixing chambers, a primary nozzle for introducing the higher-pressure air into a respective mixing chamber, and a secondary nozzle for introducing the lower pressure air to a respective mixing chamber.

15 Claims, 1 Drawing Sheet

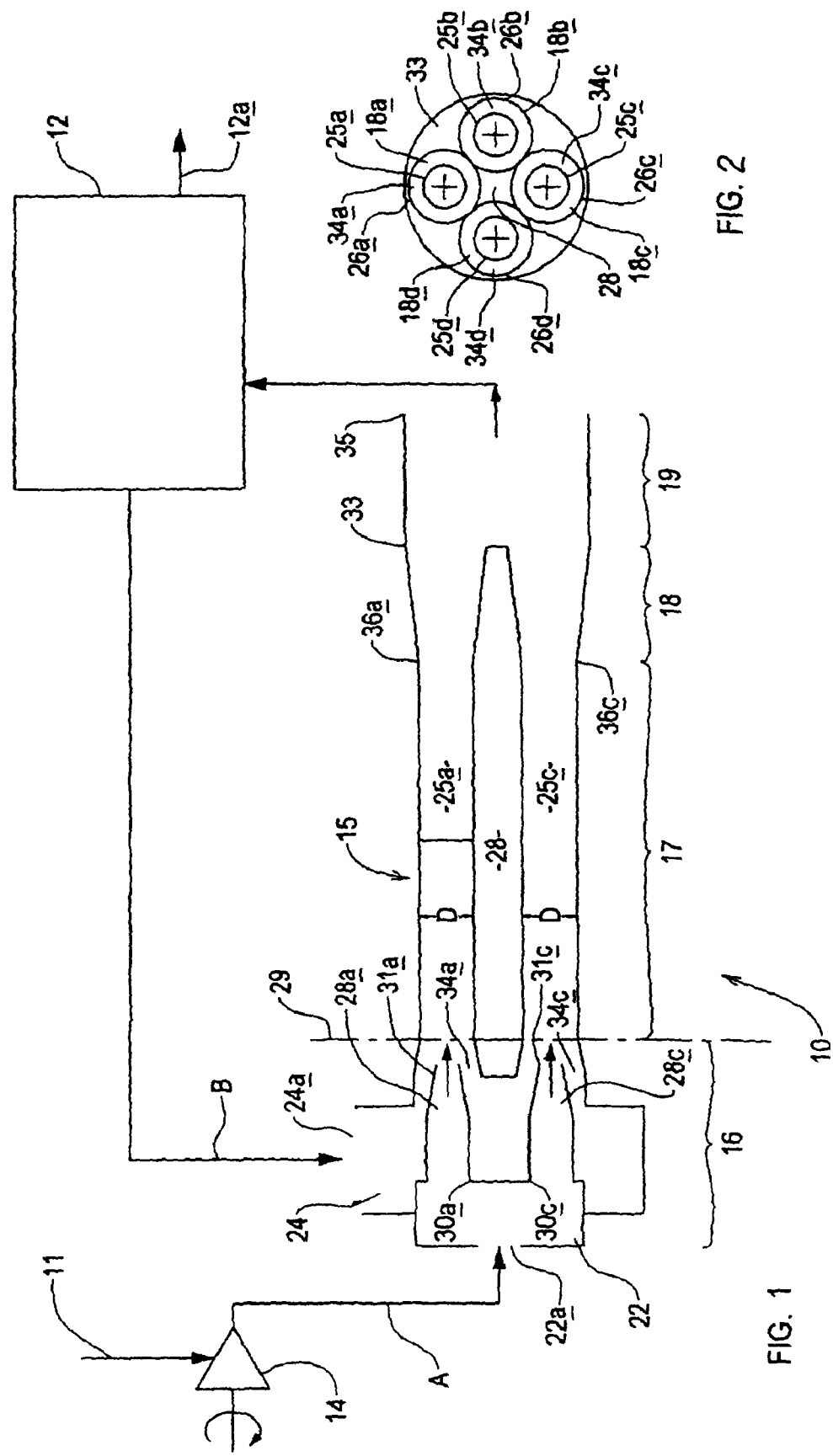

US 8,099,973 B2

ENVIRONMENTAL CONTROL SYSTEM

CROSS-REFERENCE TO RELATED APPLICATIONS

Priority is claimed to European patent application Serial No. 07022904.2 filed Nov. 26, 2007.

STATEMENT REGARDING FEDERALLY SPONSORED RESEARCH OR DEVELOPMENT

Not Applicable.

TECHNICAL FIELD

This invention relates to an environmental control system for conditioning the environment of a compartment such as a passenger cabin, in a vehicle such as an aircraft.

BACKGROUND OF THE INVENTION

To maximize cooling efficiency in conditioning an aircraft cabin for example, it is known to recirculate some cabin air and to mix the warm cabin air with cooler air cooled by the environmental control system. An air motive source is provided for recirculating the cabin air which is at a lower pressure than the cooler air cooled by the environmental control system. In typical prior proposals, the warmer low pressure cabin air and cooler, higher-pressure air are introduced to a mixing device, from where the mixed air is reintroduced to the cabin. Such environmental control systems may be used to condition the environment in other aircraft and generally in other vehicle compartments.

Jet pump apparatus are known for mixing higher and lower pressure gases in order to provide a mixed gas supply to a downstream apparatus. Jet pumps may alternatively be called injectors, airmovers, inducers, inspirators, vacuum pumps, ejectors, pressure exchangers, venturis, etc. These include a mixing chamber to which higher and lower pressure gas supplies are provided.

It has been found that in a conventional jet pump design, there is preferred relationship between the mixing chamber cross section and mixing chamber length for optimum mixing, this relationship commonly being expressed where the mixing chamber is of circular cross section, as a ratio between the mixing chamber length and diameter, which typically is about 8. Achieving this ratio places constraints on jet pump design. Particularly, in some applications there is insufficient space to accommodate a jet pump with a sufficiently long mixing chamber.

BRIEF SUMMARY OF THE INVENTION

According to a first aspect of the invention we provide an environmental control system for conditioning a compartment of a vehicle. The system includes a turbine over which hot pressurized air is expanded and cooled to provide air which is cooler and at higher-pressure than the warmer lower pressure air of the compartment, a mixing device to which the higher-pressure cooler air from the turbine and lower pressure warmer air from the compartment are mixed, and a pump for recirculating compartment air. The mixing device comprises a jet pump which includes an inlet section, an outlet section, a diffuser section and a mixing section. The inlet section includes a primary air inlet for the higher-pressure cooler air from the turbine, and a secondary air inlet for lower pressure warmer air from the compartment. The mixing section includes a plurality of separated mixing chambers. The diffuser section includes diffusers for receiving mixed air from each of the mixing chambers. The outlet section receives the mixed air from the diffuser section and conveys the mixed air to a mixed air outlet which is connected in use to the compartment. The inlet section includes for each of the plurality of mixing chambers, a primary nozzle for introducing primarily the higher-pressure air from the primary air inlet to a respective mixing chamber, and a secondary nozzle for introducing primarily the lower pressure air from the secondary air inlet to a respective mixing chamber.

The jet pump apparatus thus may provide the combined functions of an air motive source and of conventional mixing device, thus simplifying the environmental control system construction and reducing components. Moreover by providing the jet pump with a plurality of, usually generally cylindrical, mixing chambers arranged generally parallel to one another, with each mixing chamber having the preferred mixing chamber length to mixing chamber cross section ratio of in the order of about 8, the overall jet pump length may be significantly shorter than a comparable conventionally constructed jet pump which has a single mixing chamber, whilst being able to provide the same mixed air to the compartment.

In this specification, the term "secondary nozzle" means an admission inlet for the lower pressure air from the secondary air inlet, to a respective mixing chamber.

According to a second aspect of the invention, we provide an aircraft including a compartment and an environmental control system according to the first aspect of the invention for controlling the environment of the compartment.

BRIEF DESCRIPTION OF THE DRAWINGS

FIG. 1 is a diagrammatic side view of an environmental control system in accordance with the present invention; and FIG. 2 is an end diagrammatic view of the jet pump apparatus of the system of FIG. 1.

DETAILED DESCRIPTION OF THE INVENTION

Referring to the drawings, there is shown an environmental control system 10 for conditioning the environment within a cabin 12 of an aircraft. In this example a supply 11 of hot pressurized air, for example from an aircraft gas turbine engine, is expanded and cooled by passing over a turbine 14 to provide a supply of primary air A which is cooler and at higher-pressure than the air within the cabin 12 to be conditioned. A portion of the lower pressure warmer air from the cabin 12 provides a secondary air supply B.

The cooler higher-pressure air of the primary air supply A may be cold, even of sub-zero temperature. The cabin 12 air will become warmed in use, and require cooling and refreshment with cooler non-recirculated, fresh air. The cabin 12 includes an outlet 12a to ambient for excess air which is replaced by the conditioned air from the primary air supply A. The secondary air supply B is thus cabin air which is to be recirculated back to the cabin 12 after cooling and refreshment by mixing with the primary air supply A. Typically, once the primary and secondary air supplies A, B have been mixed as described below, the temperature of the mixed air which is recirculated back to the cabin, is about 2° C. in a typical aircraft cabin 12 environmental control system 10.

The pressure ratio of the cooler higher-pressure air to the warmer pressure cabin air in a typical installation is arranged to be only about between 1.1 and 1.5 to 1. Nevertheless, in such a typical conventional installation, an air motive source, such as a pump, is needed to pump the lower pressure recirculating air supply B into a mixing device to which the higher-pressure primary air supply A is fed.

In accordance with the present invention though, the primary and secondary air supplies A, B are mixed together by a jet pump apparatus 15 which has an inlet section 16, a mixing section 17, a diffuser section 18 and an outlet section 19. The jet pump apparatus 15 draws the secondary air supply B from the cabin 12 for mixing with the primary air supply A.

The inlet section 16 includes a higher-pressure air inlet duct 22 into which the cooler higher-pressure primary air A passes from a primary air inlet 22*a*. The inlet section 16 further includes a lower pressure air inlet duct 24 into which the warmer lower pressure air passes from a secondary air inlet 24*a*.

The mixing section 17 is provided by a plurality of mixing chambers 25*a*-25*d*, four in this example, where the higher and lower pressure airs are mixed. The mixing chambers 25*a*-25*d* each receive both higher and lower pressure air from the inlet section 16, and each communicate with a respective diffuser 18*a*-18*d* of the diffuser section 18, which conveys the mixed air to the common outlet section 19, a mixed air outlet 35 of which is connected to and conveys mixed air, to the aircraft cabin 12.

In this example, the mixing chambers 25*a*-25*d* are each generally cylindrical having a common and constant diameter D. The mixing chambers 25*a*-25*d* extend generally parallel to one another and there is an axially extending spacing 28 between the four mixing chambers 25*a*-25*d*, which may be a void as illustrated or a solid body.

Each mixing chamber 25*a*-25*d* extends from a mixing plane 29 where the inlet section 16 terminates, to the respective diffuser 18*a*-18*d* of the diffuser section 18. The diffusers 18*a*-18*d* are each generally circular in cross section and in this example, each has an inlet 36*a*-36*d* which has a diameter which affords it a cross section which is the same as the cross section of the respective mixing chamber 25*a*-25*d*. In this example the axially extending spacing 28 continues between the diffusers 18*a*-18*d*. The diameters of the diffusers 18*a*-18*d* increase along the axial extents of the diffusers 18*a*-18*d* towards the outlet section 19. Exterior diffuser walls 26*a*-26*d*, at least at the larger diameter ends of the diffusers 18*a*-18*d*, are in contact in this arrangement so that the mixing chambers 25*a*-25*d* are as closely nested as possible.

The outlet section 19 is in this example cylindrical, and has an inlet 33 which receives the mixed air from each of the diffusers 18*a*-18*d*. The outlet section inlet 33 diameter where the outlet section 19 receives mixed air from each of the diffusers 18*a*-18*d*, is at least as great as the combined cross sections of the diffusers 18*a*-18*d* at their largest cross section ends, and this example, the outlet section inlet 33 cross section equals the combined cross sections of the largest diameter ends of the diffusers 18*a*-18*d* plus the cross section of the axially extending spacing 28. The outlet section 19 is of generally constant diameter. The outlet section 19 includes the mixed air outlet 35 which is connected to the cabin 12.

The inlet section 16 includes primary nozzles 28*a*-28*d*, four in this example, which each receives the cooler higher-pressure air from the higher-pressure air inlet duct 22 and provides the higher-pressure air to a respective mixing chamber 25*a*-25*d*. Each primary nozzle 28*a*-28*d* has a respective larger cross section nozzle inlet 30*a*-30*d* to receive the higher-pressure air from the higher-pressure air inlet duct 22, and a smaller cross section outlet 31*a*-31*d* to deliver the higher-pressure air to its respective mixing chamber 25*a*-25*d*. The primary nozzles 28*a*-28*d* in this example extend generally parallel to one another along respective axes which lie in line with the higher-pressure air flow direction as the higher-pressure primary air A enters the primary air inlet 22*a* of the inlet section 16.

The smaller cross section downstream ends of the primary nozzles 28*a*-28*d* terminate at, or preferably just upstream of the mixing plane 29. The primary nozzles 28*a*-28*d* may reduce in cross section continuously from their respective larger cross section inlets 30*a*-30*d* to their respective small cross section outlets 31*a*-31*d*, or may include one or more sections of respective constant diameters as required.

The inlet section 16 further includes a secondary nozzle 34*a*-34*d* to each of the mixing chambers 25*a*-25*d*, the secondary nozzles 34*a*-34*d* each generally surrounding a respective primary nozzle 25*a*-25*d*. The secondary nozzles 34*a*-34*d* are defined between the primary nozzles 28*a*-28*d*. The secondary nozzles 34*a*-34*d* each receive lower pressure air from the lower pressure air inlet duct 24 in a direction generally transverse to the secondary air flow B direction as the lower pressure secondary air B enters the secondary inlet 24*a*, and the secondary nozzles 34*a*-34*d* each communicate the lower pressure air to a respective mixing chamber 25*a*-25*d*.

In this example, it can be seen that the cross section of the secondary air inlet 24 is larger than the cross section of the primary air inlet 22*a*. The inlet section 16 geometry shown and described results in the higher-pressure air A entering the respective mixing chambers 25*a*-25*d* through the primary nozzles 28*a*-28*d* whilst the lower pressure air enters the mixing chambers 25*a*-25*d* through the secondary nozzles 34*a*-34*d*. As is well known to a person skilled in the art, the reducing cross sections of primary nozzles 28*a*-28*d* in the direction of air flow, each create a jet effect to draw the lower pressure air into the secondary air inlet 24*a*, thus to draw air from the cabin 12 for cooling and refreshment as it is mixed with the fresh cooler primary air A from the turbine 14. Each mixing chamber 25*a*-25*d* preferably has a length to diameter ratio in the order of about 8, which it is well known, results in the most efficient mixing of the different pressure airs.

The geometry of the jet pump apparatus 15 described provides functionally, four jet pumps, but with common inlet 16 and outlet 19 sections. The apparatus 15 is significantly shorter in overall length than would be an equivalent single mixing chamber jet pump for delivering the same mixed air supply to the downstream gas using apparatus 12, whilst the preferred relationship between the mixing chamber length to cross section, expressed in this example as the length to diameter ratio of 8, which would be required in a single mixing chamber arrangement, is preserved for each of the multiple mixing chambers 25*a*-25*d* of the jet pump apparatus 15 described. Accordingly the jet pump apparatus 15 may be used in applications where there is insufficient space to accommodate a longer single mixing chamber jet pump.

Various modifications may be made without departing from the scope of the invention. In this example, the geometries of the primary and secondary nozzles, the mixing chambers, and diffusers are all substantially the same so that each of the effectively four jet pumps, contributes about the same pressure and temperature of mixed air, but other arrangements are possible.

Although in this example, four mixing chambers 25*a*-25*d* are provided, in another example two, three or more than four mixing chambers 25*a*-25*d* may be provided to achieve a desired mixed air supply with a jet pump apparatus shorter than an equivalent single mixing chamber jet pump. The mixing chambers 25*a*-25*d* need not be circular in cross section as described, although this is a preferred configuration, provided that the preferred mixing chamber length to cross section relationship is maintained. Similarly the outlet section 19 need not be circular in cross section, and the diffusers 18a-18d for each of the mixing chambers 25a-25d need not be frusto-conical as shown and described, although again, this is a preferred configuration.

The multiple mixing chambers 25a-25d and their diffusers 18a-18d need not be nested as illustrated, particularly where a different multiple number of mixing chambers 25a-25d are provided than the four in the example. Preferably the exterior wall 26a-26d of each diffuser 18a-18d will be in contact with or at least as close as is practical, to as many other exterior diffuser walls 26a-26d as is possible, so as to provide a smooth transition for the mixed air from the diffusers 18a-18d into the outlet section 19, and so that the outlet section 19 cross section can be at least the same as or larger than the cross section of the lower pressure air inlet 24.

As described, the primary nozzles 28a-28d may each be of frusto-conical configuration, which is preferred, but may be of other suitable configurations. The secondary nozzles 34a-34d may be provided otherwise than between and surrounding the primary nozzles 28a-28d as in the example described.

In the example, the higher-pressure primary air supply A from the turbine 14 enters the inlet section 16 in a direction which is in line with the direction in which the higher-pressure flows through the primary nozzles 25a-25d, which is transverse to the direction in which the lower pressure air B from the cabin 12 enters the inlet section 16. Preferably these airs enter the inlet section 16 in relatively transverse directions, but in another design, the primary air A may enter the inlet section 16 in a direction transverse to the primary air flow direction through the primary nozzles 25a-25d and the secondary air B may enter the inlet section 16 in a direction in line with the lower pressure air flow direction though the secondary nozzles 34a-34d. In another embodiment, the primary and secondary air supplies A, B may enter the inlet section 16 in the same or generally the same direction.

The jet pump apparatus 15 described may be readily fabricated or otherwise made, in metal or another suitable material.

The jet pump apparatus 15 in the example is part of an environmental control system 10 for conditioning the air of a cabin 12 of an aircraft, but the system may be used for conditioning the environment of any other compartment in an aircraft or other vehicle.

The invention claimed is:

1. An environmental control system for conditioning a compartment of a vehicle containing warm air, the system including a turbine over which hot pressurized air is expanded and cooled to provide air which is cooler and at higher-pressure than warmer lower pressure air from the compartment, and a mixing device to which the higher-pressure cooler air from the turbine and lower pressure warmer air from the compartment are mixed, wherein the mixing device comprises a jet pump which includes an inlet section, an outlet section, a diffuser section and a mixing section, said inlet section including a primary air inlet connected for receiving the higher-pressure cooler air from the turbine and a secondary air inlet adapted to be connected for receiving lower pressure warmer air from the compartment, said mixing section including a plurality of separated mixing chambers, and said diffuser section including diffusers which receive mixed air from each of said mixing chambers, and said outlet section receiving mixed air from said diffuser section and conveying the mixed air to a mixed air outlet which is adapted to be connected in use to the compartment, said inlet section including for each of the plurality of mixing chambers a primary nozzle for introducing primarily the higher-pressure air from said primary air inlet to a respective mixing chamber, and a secondary nozzle for introducing primarily the lower pressure air from said secondary air inlet to a respective mixing chamber.

2. A system according to claim 1, wherein said plurality of mixing chambers are arranged generally parallel to each other.

3. A system according to claim 1, wherein said mixing chambers are generally cylindrical, and wherein each mixing chamber having a mixing chamber length to mixing chamber diameter ratio in the order of about 8.

4. A system according to claim 1, wherein each primary nozzle has a larger cross section nozzle inlet to receive primarily higher-pressure air and a smaller cross section nozzle outlet to deliver the higher-pressure air to a mixing chamber.

5. A system according to claim 4, wherein said primary nozzles each extend along generally parallel axes in line with a higher-pressure air flow direction as the higher-pressure air enters said primary air inlet of said inlet section.

6. A system according to claim 4, wherein said inlet section includes a high pressure air inlet duct which communicates directly with all of said larger cross section primary nozzle inlets.

7. A system according to claim 1, wherein each of said secondary nozzles generally surrounds a respective primary nozzle.

8. A system according to claim 7, wherein said secondary nozzles each receive lower pressure air directly from a lower pressure air inlet duct of said inlet section.

9. A system according to claim 8, wherein said secondary nozzles each extend along generally parallel axes transverse to the air flow direction as the lower pressure air enters said secondary air inlet of said inlet section.

10. A system according to claim 1, wherein each of said diffusers of said diffuser sections has a cross section which increases towards said outlet section.

11. A system according to claim 10, wherein said mixing chambers are each of circular cross section, and said mixing chambers are closely nested so that there is an axially extending spacing between said nested mixing chambers.

12. A system according to claim 11 characterized in that diffuser exterior walls are in contact with the exterior walls of all of the other diffusers.

13. A system according to claim 11, wherein the cross section of said outlet section where it receives the mixed air substantially equals the combined cross sections of each of said diffusers at their largest cross section ends plus the cross section of said axially extending spacing.

14. An environmental control system for conditioning a compartment containing warm air, the system including a source of cooler air at higher-pressure than warmer lower pressure air from the compartment, and a mixing device to which the higher-pressure cooler air and lower pressure warmer air from the compartment are mixed, wherein the mixing device comprises a jet pump which includes an inlet section, an outlet section, a diffuser section and a mixing section, said inlet section including a primary air inlet connected for receiving the higher-pressure cooler air from the turbine and a secondary air inlet adapted to be connected for receiving lower pressure warmer air from the compartment, said mixing section including a plurality of separated mixing chambers, and said diffuser section including diffusers which receive mixed air from each of said mixing chambers, and said outlet section receiving mixed air from said diffuser section and conveying the mixed air to a mixed air outlet which is adapted to be connected in use to the compartment, said inlet section including for each of the plurality of mixing chambers a primary nozzle for introducing primarily the higher-pressure air from said primary air inlet to a respective mixing chamber, and a secondary nozzle for introducing primarily the lower pressure air from said secondary air inlet to a respective mixing chamber.

15. An aircraft including a compartment and an environmental control system for conditioning a compartment of the aircraft, the system including a turbine over which hot pressurized air is expanded and cooled to provide air which is cooler and at higher-pressure than warmer lower pressure air from the compartment, and a mixing device to which the higher-pressure cooler air from the turbine and lower pressure warmer air from the compartment are mixed, wherein the mixing device comprises a jet pump which includes an inlet section, an outlet section, a diffuser section and a mixing section, said inlet section including a primary air inlet connected for receiving the higher-pressure cooler air from the turbine and a secondary air inlet adapted to be connected for receiving lower pressure warmer air from the compartment, said mixing section including a plurality of separated mixing chambers, and said diffuser section including diffusers which receive mixed air from each of said mixing chambers, and said outlet section receiving mixed air from said diffuser section and conveying the mixed air to a mixed air outlet which is adapted to be connected in use to the compartment, said inlet section including for each of the plurality of mixing chambers a primary nozzle for introducing primarily the higher-pressure air from said primary air inlet to a respective mixing chamber, and a secondary nozzle for introducing primarily the lower pressure air from said secondary air inlet to a respective mixing chamber.

* * * * *